United States Patent [19]

Rivinius

[11] 3,986,724
[45] Oct. 19, 1976

[54] HYDRAULICALLY OPERATED OPERATOR'S STEP FOR LARGE MACHINERY

[76] Inventor: Theodore Rivinius, 810 N. 2nd St., Bismarck, N. Dak. 58501

[22] Filed: July 16, 1975

[21] Appl. No.: 596,355

[52] U.S. Cl. .............................. 280/166; 214/75 T; 214/77 P
[51] Int. Cl.² .......................................... B60R 3/02
[58] Field of Search .......... 280/166; 214/75 T, 77 P

[56] References Cited
UNITED STATES PATENTS

| | | | |
|---|---|---|---|
| 2,656,058 | 10/1953 | Foote | 214/77 P |
| 2,683,540 | 7/1954 | Wood | 214/77 P |
| 2,774,494 | 12/1956 | Malmstrom | 214/77 P |
| 3,233,758 | 2/1966 | Darfus | 214/75 T |
| 3,589,537 | 6/1971 | Petersen | 214/75 T |
| 3,658,196 | 4/1972 | Schmitt | 214/77 P |
| 3,887,217 | 6/1975 | Thomas | 280/166 |

Primary Examiner—Robert R. Song
Attorney, Agent, or Firm—Dugger, Johnson & Westman

[57] ABSTRACT

The present invention relates to steps for large machinery such as road graders, and more particularly to a hydraulically operated step which elevates the operator from a lowered position to a position where he can easily move into the operator's cab.

7 Claims, 3 Drawing Figures

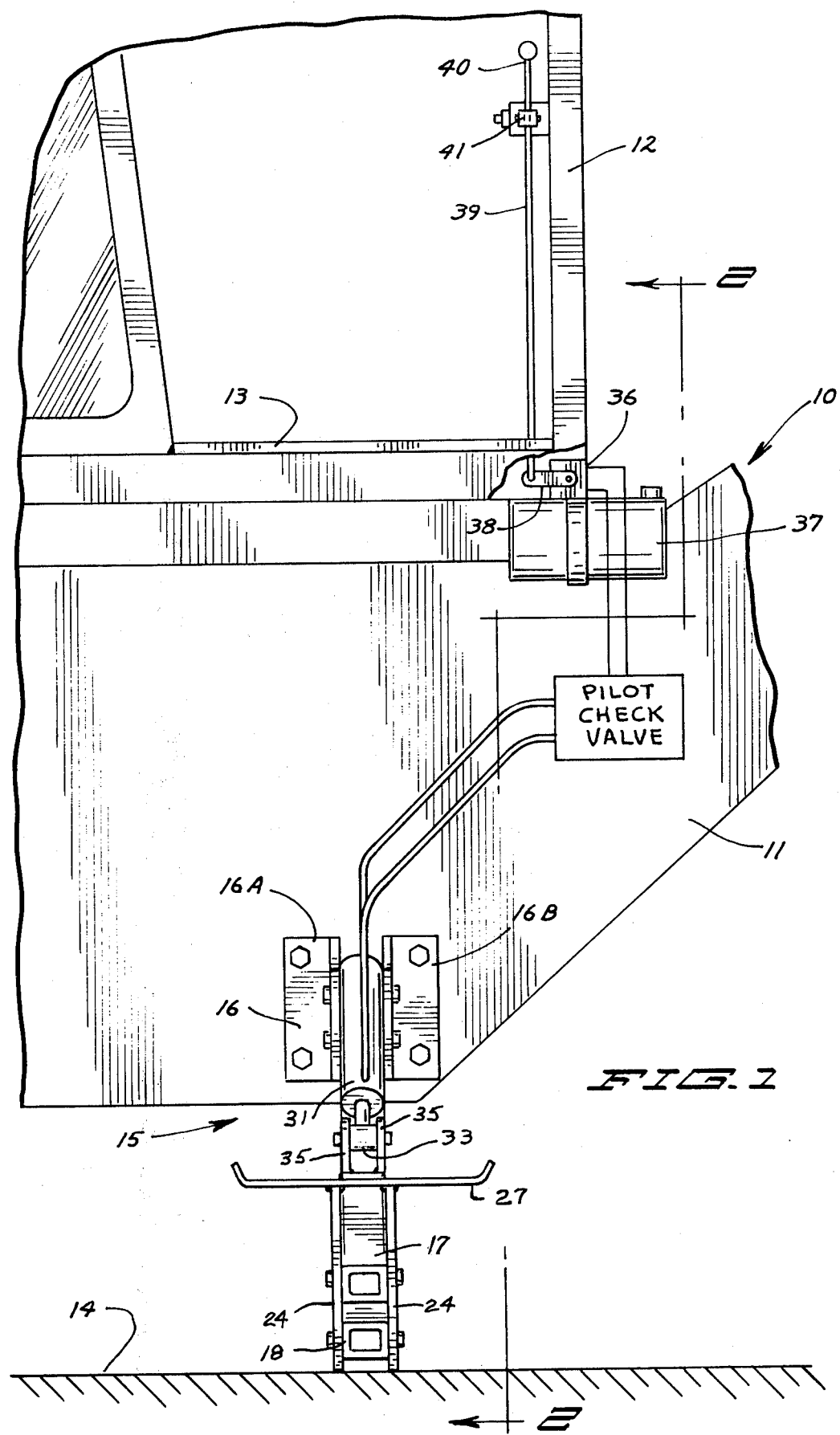

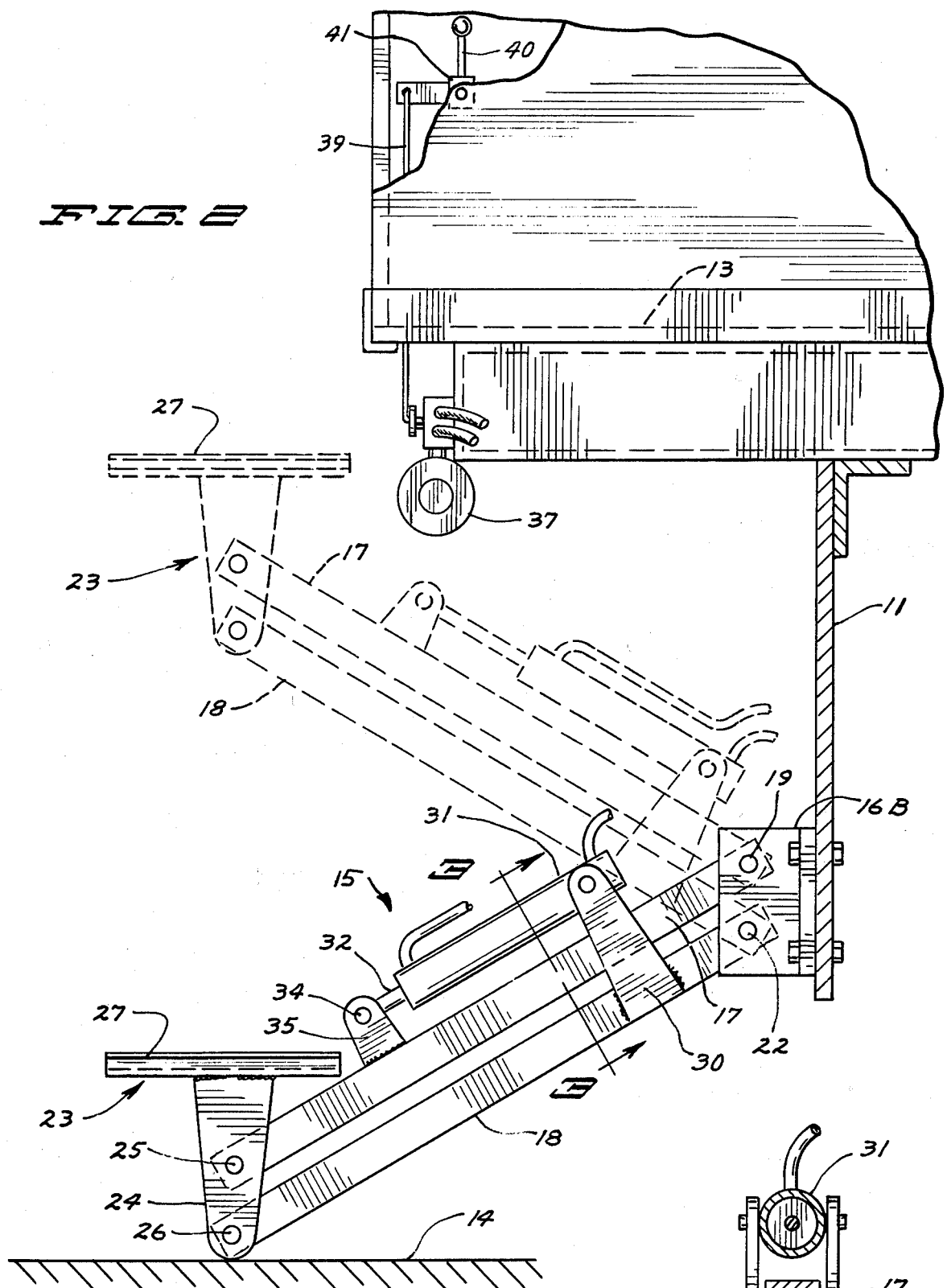

HYDRAULICALLY OPERATED OPERATOR'S STEP FOR LARGE MACHINERY

BACKGROUND OF THE INVENTION

1. Field of the Invention

The present invention relates to automatically operated steps for large machinery such as road graders and earthworking equipment.

2. Prior Art

In the prior art road graders, for example, have had fixed steps or else have had steps which will merely fold out of the way during use. As the equipment becomes larger and larger, the effort required to use the steps is substantial. In many cases the steps have to be recessed back inwardly from the periphery of the vehicle to keep them from being damaged, so that they are extremely difficult to use.

Folding steps for travel trailers etc. have been advanced, but these merely move the steps out of the way when not in use.

Platforms have been used for raising loads up to truck beds, comprising hydraulically operated tailgates that use a parallel linkage for operation. Such linkage for a load tailgate is shown in U.S. Pat. No. 3,233,758, and various other similar devices show parallel linkages for raising a platform. Typical of these include U.S. Pat. Nos. 2,576,881; 3,589,537; 3,077,275; 2,701,656; and 2,656,058. A folding ladder is shown in U.S. Pat No. 3,869,022, and a retractable step using an electric motor for retraction is shown in U.S. Pat. No. 3,887,217. However, none of these show an elevating type of step that can be used by an operator to simply and easily raise himself to a level position with an operator's cab of large earthworking equipment.

SUMMARY OF THE INVENTION

The present invention relates to a power actuated step for use with large earthworking equipment such as road graders, and other large machinery. The power actuated step is made to mount directly to the main frame of the implement or machine on which it is attached, and to move from a position wherein a step member is adjacent to the ground to a second position wherein the step member is substantially on a level equal to the operator's platform floor, or adjacent to it, so that an operator on the elevating step can easily move onto the platform.

The step comprises a base mounting member with parallel linkages controlling movement of the step itself so the step remains oriented substantially parallel to the ground throughout its travel. The controls for the step are placed adjacent to the operator's door so that an operator can operate the step from the ground and also from the operator's platform.

In the form shown, a simple hydraulic cylinder arrangement is utilized with a unique mounting between the parallel linkages used and a fixed base member that can easily be attached to a frame of the implement on which the step is to be used. The hydraulic cylinder can be actuated through the existing hydraulic systems on the earthworking machine, or can have its own separate, small electric motor driving a hydraulic pump as shown, to form a self contained attachment package. The control shown also is part of the attachment package to make installation a simple operation. The electric motor is easily connected to the electric system of the implement.

The device is relatively easy to make, and easy to operate. Where operators are required to get on and off machines a substantial amount, and where the machines are extremely high and the conventional ladders have to be recessed, the safety provided by the present step greatly outweighs the cost of adding the step. In fact, accidents around earthworking machinery frequently involve slipping from a ladder or step in an attempt to get up into or down from the cab.

The present step will operate in all types of environments, including icy and wet conditions.

BRIEF DESCRIPTION OF THE DRAWINGS

FIG. 1 is a fragmentary side view of an earthworking implement having a step made according to the present invention installed thereon;

FIG. 2 is a sectional view taken as on line 2—2 in FIG. 1; and

FIG. 3 is a sectional view taken as on line 3—3 in FIG. 2.

DESCRIPTION OF THE PREFERRED EMBODIMENT

An earthworking machine 10, for example a road grader, has a main side frame 11 of usual construction, and this frame is only shown schematically to represent a typical mounting for which the step of the present invention can be utilized. The earthworking machine or grader has an operator's cab 12 thereon of usual configuration with an operator's platform 13 at a level located substantially above the ground indicated at 14. Typically these levels can be on the range of 5 feet above the ground, and thus generally some type of a ladder, which is generally unsafe, and difficult to use is provided.

In the present device, the main machine frame is used for mounting an elevator step or movable step indicated generally at 15. The step is made as a replaceable attachment or unit that can be used with a wide variety of earthworking machines, and includes a base mounting bracket 16 that in the form shown comprises a pair of side members 16A and 16B bolted directly to the frame member 11 on a vertical side surface thereof, and which in turn pivotally mounts an upper link 17 and a lower link 18 thereto about pivots indicated at 19 and 20, respectively. The brackets 16A and 16B can be welded to the frame in any desired location. The links 17 and 18 are square tubes, as shown, that extend outwardly from the bracket 16 and which are mounted at their outer ends to a step assembly 23. The step assembly as shown has a pair of vertical legs 24,24 which are positioned on opposite sides of the links 17 and 18 and the links in turn are pivotally mounted as at 25 and 26, respectively to these legs 24 so that the links 17 and 18 form a parallel pair of links extending between the bracket 16 and the step assembly 23. The step assembly includes a horizontal step platform 27 on which an operator can stand when being raised, and this can have suitable stop members or guide rails around the sides as desired.

A pair of upright mast type brackets 30 are mounted on opposite sides of the lower link 18, and extend past the upper link 17 but are not attached to the upper link. These brackets 30 are mounted adjacent to the base bracket 16, and at the upper ends of the brackets 30, a hydraulic cylinder 31 is pivotally mounted. As shown, the base end of the cylinder is mounted to the brackets 30, and the cylinder 31 has an extendable and retractable rod 32 that has a rod end member 33 which in turn is pivotally mounted as at 34 to a pair of ears 35 that are fixed to the top of the upper link 17 at a position adjacent to the step assembly 23.

The hydraulic cylinder 31 can be a single acting cylinder if desired, or a double acting cylinder, and is controlled through a suitable valve 36 that is mounted to a control package 37 fixed to the machine frame adjacent to the operator's door as shown in FIG. 2. The control for the valve includes a lever 38 that is operated by a link 39 that extends upwardly adjacent a corner of the platform and is in turn operated by a bell crank lever 40 that is pivoted on a support 41. The lever 40 is in a position where it can be reached by a person of normal height standing on the ground and also is convenient for operation by a person on the operator's platform. The support 41 and other linkage for actuating the valve are part of the control package 37 and can be mounted to the machine in any desired manner. The control package includes the valve 36, a hydraulic pump, an electric motor to drive the pump and a small reservoir for hydraulic fluid. For safety, a pilot operated check valve, shown schematically is used between the valve and cylinder to prevent dropping of the step.

When the step is to be used and is in position adjacent to the ground 14 as shown, an operator merely stands on the step platform 27, actuates the valve by moving the lever 40, and the cylinder 31 will be operated to extend the rod 32. This will act through the ears 34 and brackets 30 to tend to cause a shifting between the links 17 and 18. This force is reacted at the pivots 25, 26 and 19 and 22 to cause the step assembly 23 to start to raise as the links 17 and 18 shift relative positions. The step platform 27 will remain parallel as the unit raises, and the links 17 and 18 will move upwardly about pivots 19 and 22. The extension of the rod of the cylinder can be sufficient amount to raise the step assembly 23 to the position shown in FIG. 2 in dotted lines so that an operator on the platform 27 can easily step out of the operator's platform of the machine indicated at 13.

The step can be maintained in this position where it will be up out of the way of the ordinary obstacles encountered during use, and the, when the operator is to descend, he merely has to step on the step, operate the valve 36 to lower the step by retracting the rod of the cylinder assembly 31.

Thus, the operation is simple, efficient, and safe. The amount of vertical movement of the step can be controlled by controlling lengths of the links, and the amount of extension of the cylinder or power source being used.

While hydraulic cylinders are illustrated as the preferred method of operation, other forms can be utilized if desired. The electric motor used in the control package is easily connected to the electric system of the machine used and is selected to be the proper voltage.

It can be started at the same time as valve 36 is operated, and the actuator for valve 36 may include a switch for motor operation simultaneously with cylinder operation.

What is claimed is:

1. A power actuated step assembly for a vehicle having an operator's platform positioned a substantial distance above the ground and having a main frame member, said assembly including a base mounting member, a pair of links pivotally mounted to said base mounting member about pivots positioned one above the other, said links extending laterally outwardly from said base mounting member, a step member comprising a generally horizontal platform of size to support a vehicle operator, means to pivotally mount said links to said step member in substantially parallel relationship to each other, a hydraulic cylinder, means to connect said hydraulic cylinder between said first and second links comprising a mast connected to a lower one of said links and extending from said lower one of said links past the upper one of said links, means to mount one end of said hydraulic cylinder to said mast above the upper one of said links, means to mount the other end of said hydraulic cylinder to the upper one of said links, and means to operate said hydraulic cylinders to extend or retract the cylinder and to change the relative positions of said first and second links whereby said step members will be raised from a first lowered position to a second position adjacent to the level of said operator's platform.

2. The combination specified in claim 1 wherein said mast means and said means to mount the other end of said cylinder are positioned between said bracket and said step.

3. The combination specified in claim 1 and a cylinder control member mounted to the operator's platform adjacent to the lateral side edge of said platform and being accessible to an operator standing on said step with the step in its lowered position.

4. The combination of claim 1 wherein said links are arranged with respect to the base mounting member to permit the step to be lowered below said base mounting member when in said first lowered position.

5. The combination of claim 4 wherein said links are of length to position said step laterally outwardly from said operators platform in the second position of said step.

6. A power actuated step assembly for a vehicle having an operator's platform positioned a substantial distance above the ground and having a main frame member, said assembly including a pair of links adapted to be pivotally mounted with respect to said main frame member about pivots positioned one above the other and extending so that the pivot axes are generally horizontal, said link extending laterally outwardly from said mounting member and aligned with and below said vehicle operator's platform, said step member comprising a generally horizontal platform of size to support a vehicle operator, means to pivotally mount the opposite ends of said link from said first mentioned pivots to said step member in substantially parallel relationship to each other, a power extendable and retractable actuator, means to connect one end of said actuator to one of said links on a side thereof opposite from the other link, mast means fixedly connected to the other of said links and mounting the other end of said actuator, said mast means extending from said other link past the said one link to position said actuator on one side of both links and extending generally parallel to the links, and control means to permit extending and retracting said actuator to change the relative positions of said first and second links so that the step member will be raised by said links from a first lowered position to a second position adjacent to said operator's platform.

7. The combination as specified in claim 6 wherein said means to operate said actuator includes a power source and a manual control lever, and means to support said manual control lever at location above said operator's platform.

* * * * *